United States Patent
Hoffmann et al.

(10) Patent No.: US 12,504,405 B2
(45) Date of Patent: Dec. 23, 2025

(54) EVAPORATION-BASED SAMPLE PREPARATION WORKFLOW FOR MASS SPECTROMETRY

(71) Applicant: Roche Diagnostics Operations, Inc., Indianapolis, IN (US)

(72) Inventors: Thomas Hoffmann, Bad Heilbrunn (DE); Peter Kupser, Starnberg (DE); Andreas Leinenbach, Peißenberg (DE); Indranil Mitra, Benediktbeuern (DE); Jatin Nandania, Tutzing (DE); Cornelia Werner, Penzberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 381 days.

(21) Appl. No.: 18/337,020

(22) Filed: Jun. 18, 2023

(65) Prior Publication Data
US 2023/0333069 A1    Oct. 19, 2023

Related U.S. Application Data

(63) Continuation of application No. PCT/EP2021/085832, filed on Dec. 15, 2021.

(30) Foreign Application Priority Data

Dec. 17, 2020    (EP) .................................... 20215190

(51) Int. Cl.
*G01N 30/12*    (2006.01)
*G01N 30/72*    (2006.01)
(Continued)

(52) U.S. Cl.
CPC ......... *G01N 30/12* (2013.01); *G01N 30/7233* (2013.01); *G01N 2030/027* (2013.01); *G01N 2030/065* (2013.01)

(58) Field of Classification Search
CPC ............... G01N 30/12; G01N 30/7233; G01N 2030/027; G01N 2030/065;
(Continued)

(56) References Cited

U.S. PATENT DOCUMENTS 7,815,803 B2 * 10/2010 Kobold .................. B01J 20/287
                                                            73/1.02
11,346,845 B2 * 5/2022 Clarke ............... G01N 30/7266
(Continued)

FOREIGN PATENT DOCUMENTS

EP          2003455 A    12/2008
JP       2008532019 A     8/2008
(Continued)

OTHER PUBLICATIONS

Kim et al., Dried Blood Spot Testing for Seven Steroids Using Liquid Chromatography-Tandem Mass Spectrometry With Reference Interval Determination in the Korean Population, Ann Lab Med, vol. 35, 2015, pp. 578-585.
(Continued)

*Primary Examiner* — David J Bolduc
(74) *Attorney, Agent, or Firm* — Taft Stettinuis & Hollister LLP

(57) ABSTRACT

The present invention relates to a method for detecting and/or quantifying an analyte in a sample using mass spectrometry. The method of the invention comprises: extracting the analyte from the sample using solid phase extraction (SPE) so as to obtain an SPE extract comprising the analyte, concentrating the analyte, said concentrating comprising evaporating solvent from the SPE-extract; and detecting and/or quantifying the analyte in the sample using mass spectrometry.

20 Claims, 6 Drawing Sheets

(51) Int. Cl.
*G01N 30/02* (2006.01)
*G01N 30/06* (2006.01)

(58) Field of Classification Search
CPC ..... G01N 2001/4027; G01N 2030/009; G01N 33/743; G01N 33/6848; G01N 1/4022; G01N 1/405; G01N 33/54326
See application file for complete search history.

(56) References Cited

U.S. PATENT DOCUMENTS

| | | | | |
|---|---|---|---|---|
| 2002/0076739 | A1* | 6/2002 | Aebersold | C12Q 1/25 435/7.92 |
| 2003/0119021 | A1* | 6/2003 | Koster | C12Q 1/6834 435/6.12 |
| 2005/0042771 | A1* | 2/2005 | Koster | G01N 33/6842 436/518 |
| 2006/0263886 | A1* | 11/2006 | Peters | G01N 33/6848 436/56 |
| 2008/0274563 | A1* | 11/2008 | Cerda | G01N 33/64 436/178 |
| 2008/0280370 | A1* | 11/2008 | Bramble, Jr. | C07F 9/3813 436/104 |
| 2010/0267068 | A1 | 10/2010 | De Boer et al. | |
| 2015/0075300 | A1* | 3/2015 | Hankemeier | G01N 1/4022 73/863.21 |
| 2016/0282371 | A1* | 9/2016 | Huang | G01N 33/82 |
| 2018/0246071 | A1* | 8/2018 | Cardin | G01N 30/12 |
| 2019/0324029 | A1* | 10/2019 | Kostovic | G01N 33/5306 |
| 2019/0324043 | A1 | 10/2019 | Wuttke et al. | |
| 2020/0041502 | A1 | 2/2020 | Bolle et al. | |
| 2020/0209124 | A1 | 7/2020 | Fornells Vernet et al. | |
| 2020/0363425 | A1* | 11/2020 | Alley | G01N 33/6848 |
| 2021/0318274 | A1* | 10/2021 | Everson | H01J 49/0031 |
| 2022/0268798 | A1* | 8/2022 | Ebihara | G01N 35/0098 |

FOREIGN PATENT DOCUMENTS

| | | |
|---|---|---|
| JP | 2009544941 A | 12/2009 |
| WO | 2006092043 A1 | 9/2006 |
| WO | 2008011158 A2 | 1/2008 |
| WO | 2018189286 A1 | 10/2018 |
| WO | 2019141779 A1 | 7/2019 |

OTHER PUBLICATIONS

Gentili, A. et al., Analysis of Free Estrogens and their Conjugates in Sewage and River Waters by Solid-Phase Extraction then Liquid Chromatography Electrospray-Tandem Mass Spectrometry, Chromatographia, 2002, pp. 25-32, vol. 56.

Gervasoni, Jacopo et al., Simultaneous quantification of 17-hydroxyprogesterone, androstenedione, testosterone and cortisol in human serum by LC-MS/MS using TurboFlow online sample extraction, Clinical Biochemistry, 2016, pp. 998-1003, vol. 49.

Kim, Jung-Ah et al., Influence of Blood Lipids on Global Coagulation Test Results, Annals of Laboratory Medicine, 2015, pp. 15-21, vol. 35.

Rossi, Claudia et al., Confirmation of congenital adrenal hyperplasia by adrenal steroid profiling of filter paper dried blood samples using ultra-performance liquid chromatography-tandem mass spectrometry, Clinical Chemistry and Laboratory Medicine, 2011, pp. 677-684, vol. 49, No. 4.

Yamamoto, Atsushi et al., Steroid Hormone Profiles of Urban and Tidal Rivers Using LC/MS/MS Equipped with Electrospray Ionization and Atmospheric Pressure Photoionization Sources, Environmental Science & Technology, 2006, pp. 4132-4137, vol. 40, No. 13.

International Search Report; European Patent Office; International Application No. PCT/EP2021/085832; Mar. 17, 2022; 4 pages.

Written Opinion of the International Searching Authority; European Patent Office; International Application No. PCT/EP2021/085832; Mar. 17, 2022; 8 pages.

International Preliminary Report on Patentability; The International Bureau of WIPO; International Application No. PCT/EP2021/085832; Jun. 29, 2023; 10 pages.

* cited by examiner

EVAPORATION-BASED SAMPLE PREPARATION WORKFLOW FOR MASS SPECTROMETRY

CROSS-REFERENCE TO RELATED APPLICATIONS

This application is a continuation of International PCT Application No. PCT/EP2021/085832 filed on Dec. 15, 2021, which claims priority to European Patent Application No. 20215190.8 filed on Dec. 17, 2020, the contents of each application are incorporated herein by reference in their entireties.

FIELD OF THE INVENTION

The present invention relates to a method for detecting and/or quantifying an analyte in a sample using mass spectrometry. The method of the invention comprises: extracting the analyte from the sample using solid phase extraction (SPE) so as to obtain an SPE extract comprising the analyte; concentrating the analyte, wherein said concentrating comprises partially evaporating solvent from the SPE-extract; and detecting and/or quantifying the analyte in the sample using mass spectrometry.

BACKGROUND OF THE INVENTION

Automated sample preparation systems for LC-MS applications as well as HPLC systems have sample volume and analyte loss associated with dead volumes leading to lower sensitivity. For example, a significant sample loss can occur during transfer of eluted sample obtained from an analyte enrichment by solid-phase extraction (SPE) front a primary reaction vessel to a secondary reaction vessel. Further sample loss can occur during the LC injection process from the dead volume of the sample or HPLC vial and of full loop injections using overfilling to ensure high accuracy and reproducibility.

Elution of analytes during SPE often requires organic solvents (e.g. 80% MeOH). However, the content of organic solvents in the sample needs to be minimized prior to LC-MS injection to maintain acceptable chromatographic performance, especially for µLC systems. Therefore such eluates are frequently diluted, e.g. by a 1:1 dilution with water, so as to lower organic solvent concentrations (e.g. ≤30-40% MeOH). This dilution causes a further loss in analyte detection sensitivity.

Accordingly, there is a high need to improve sample preparation workflows for mass spectrometry such that analyte loss is minimized and a higher analyte detection sensitivity can be achieved, especially in the context of sample preparation processes using SPE techniques (e.g. a magnetic particle based SPE technique).

SUMMARY OF THE INVENTION

Herein provided is a method for detecting and/or quantifying an analyte of interest in a sample using mass spectrometry, said method comprising:
a) extracting the analyte from the sample using solid phase extraction (SPE) so as to obtain an SPE extract comprising the analyte:
b) concentrating the analyte by partially evaporating solvent from the SPE-extract obtained in a), and
c) detecting and/or quantifying the analyte in the sample using mass spectrometry.

In particular, the present invention also relates to the following items:
1. A method for detecting and/or quantifying an analyte in a sample using mass spectrometry, said method comprising:
   a) extracting the analyte from the sample using solid phase extraction (SPE) so as to obtain an SPE extract comprising the analyte;
   b) concentrating the analyte, said concentrating comprising evaporating solvent from the SPE-extract obtained in a); and
   c) detecting and/or quantifying the analyte in the sample using mass spectrometry,
   preferably a method for detecting and/or quantifying an analyte in a sample using mass spectrometry, said method comprising:
   a) extracting the analyte from the sample using solid phase extraction (SPE) so as to obtain an SPE extract comprising the analyte, wherein the SPE extract comprises 50 vol % e to 100 vol % of an organic solvent, wherein the analyte is a steroid, preferably selected from the group consisting of testosterone and estradiol;
   b) concentrating the analyte, said concentrating comprising partially evaporating the solvent from the SPE-extract obtained in a); wherein the volume of the SPE-extract subjected to the partial evaporation is reduced by 50% to 95%, preferably by 60% to 90%, more preferably by 70% to 80%;
   b1) diluting the concentrated analyte obtained from step b) with a dilution solvent to obtain a diluted analyte, wherein the diluted analyte comprises less than 50 vol % of the organic solvent or a further organic solvent prior to step c); and
   c) detecting and/or quantifying the analyte in the sample using mass spectrometry, wherein the mass spectrometry is mass spectrometry coupled to liquid chromatography (OC-MS).
2. The method of item 1, wherein said evaporation of solvent from the SPE extract is a partial evaporation of the solvent from the SPE extract.
3. The method of item 1 or 2, wherein the volume of the SPE-extract subjected to the concentrating is reduced by 50% to 95%, in an embodiment by 60% to 90%, in an embodiment by 70% to 80%, in an embodiment by 73% to 87%.
4. The method of item 3, wherein the method further comprises adjusting the volume after evaporation using a diluent solution to a final volume corresponding to 5% to 40%, in an embodiment 10% to 30%, in an embodiment 13% to 27% of the volume of the sample subjected to the SPE in a).
5. The method of item 4, wherein the diluent solution is an aqueous solution with organic solvent concentrations lower than 10 vol %, in particular 5 vol %, in particular 0 vol %.
6. The method of item 4, wherein the dilution solution is water.
7. The method of any one of items 1 to 6, wherein the sample volume subjected to the SPE in a) is 250 µl or less, in an embodiment 200 µl or less, in an embodiment 150 µl or less, in an embodiment 150 µl.
8. The method of any one of items 1 to 7, wherein the volume of the sample subjected to SPE is 150 µl, and wherein the volume of the SPE-extract is reduced by the concentrating to a final volume of 10 µl to 60 µl, in an embodiment 20 µl to 50 µl, in an embodiment 40 µl.

9. The method of any one of items 1 to 8, wherein the SPE extract comprises 50 vol % to 100 vol % of an organic solvent.
10. The method of item 9, wherein the organic solvent is selected from the group consisting of acetonitrile and methanol.
11. The method of any one of items 1 to 10, wherein the analyte is a steroid
12. The method of any one of items 1 to 11, wherein the analyte is a steroid hormone, in an embodiment a steroid hormone selected form the group consisting of an androgen, an estrogen, a glucocorticoid, a mineralocorticoid and a gestagen.
13. The method ofany one of items 1 to 12, wherein the analyte is an androgen or an estrogen
14. The method of item 13, wherein the androgen is testosterone.
15. The method of item 13, wherein the estrogen is estradiol
16. The method of any one of items 1 to 15, wherein the sample is a fluid, in particular a biological fluid.
17. The method of any one of items 1 to 16, wherein the sample is an obtained body fluid, in an embodiment human body fluid.
18. The method ofany one of items 1 to 17, wherein the sample is serum or plasma
19. The method of any one of items 1 to 18, wherein said method further comprises a pretreatment step for releasing the analyte from an analyte binding protein
20. The method of any one of items 1 to 19, wherein the SPE is a batch-type SPE.
21. The method of any one of items 1 to 20, wherein the solid phase used for the SPE is formed by magnetic particles, in particular magnetic microbeads.
22. The method ofany one of items 1 to 21, wherein the solid phase of the SPE is formed by particles (e.g. magnetic particles) configured to capture the analyte from the sample and to release said analyte when treated with an elution solvent.
23. The method of any one of items 1 to 22, wherein the solid phase of the SPE is formed by particles (e.g. magnetic particles) coated with an antibody specifically binding to the analyte
24. The method of any one of items 1 to 23, wherein the solid phase of the SPE is formed by a porous polymer matrix capable of binding or adsorbing the analyte in the sample and capable of releasing the analyte when treated with an elution solution.
25. The method of any one of items 1 to 24, wherein the solid phase extraction (SPE) comprises
   a) capture the analyte to a solid phase.
   b) optionally one or more wash steps of the solid phase; and
   c) eluting the analyte from the solid phase to obtain the SPE extract comprising the analyte
26 The method of item 25. % herein eluting the analyte comprises adding an elution solvent to the solid phase and incubating the solid phase in presence of the added elution solvent.
27. The method of item 25 or 26, wherein the volume of the added elution solvent corresponds to 50% to 150% of the sample volume subjected to SPE, in an embodiment 90% to 120% of the sample volume subjected to SPE, in an embodiment 100% of the sample volume subjected to SPE.
28. The method of any one of items 25 to 27, wherein the elution solvent comprises ACN, in particular at a concentration of 40 to 100 vol %, in particular 45 to 90 vol %, in particular 60 to 80 vol %.
29. The method of any one of items 25 to 27, wherein the elution solvent comprises MeOH, in particular at a concentration of 70 to 100 vol %, in particular 80 to 90 vol %, in particular 80 vol %.
30. The method of an one of items 1 to 29, wherein said method further comprises adding an internal standard (ISTD) for quantification to the sample prior to step a).
31. The method of item 30, wherein the ISTD is the analyte artificially labeled with one or more heavy isotopes.
32. The method of any one of items 1 to 31, wherein the mass spectrometry is mass spectrometry coupled to liquid chromatography (e.g. wherein the analysis is a LC-MS analysis or more specifically a LC-MS/MS analysis).
33. The method of item 32, wherein the liquid chromatography (LC) is HPLC or rapid LC.
34. The method of item 32 or 33, wherein the LC is a Micro LC
35. The method of any one of items 32 to 34, wherein the LC is Ultra high performance liquid chromatography (UHPLC).
36. The method of any of items 1 to 35, wherein the mass spectrometry is performed with a mass spectrometer using electrospray ionization (ESI).
37. The method of any of items 1 to 36, wherein the mass spectrometry is performed with a mass spectrometer that is a tandem mass spectrometer, in particular a triple quadrupole mass spectrometer.
38. The method of any one of items 1 to 37, wherein the method is automated.

DETAILED DESCRIPTION OF THE INVENTION

The present invention relates to a method for detecting and/or quantifying an analyte of interest in a sample using mass spectrometry, said method comprising:
   a) extracting the analyte from the sample using solid phase extraction (SPE) so as to obtain an SPE extract comprising the analyte;
   b) concentrating the analyte, said concentrating comprising evaporating solvent from the SPE-extract obtained in a); and
   c) detecting and/or quantifying the analyte in the sample using mass spectrometry.

In a preferred aspect, the present invention relates to a method for detecting and/or quantifying an analyte in a sample using mass spectrometry, said method comprising:
   a) extracting the analyte from the sample using solid phase extraction (SPE) so as to obtain an SPE extract comprising the analyte, wherein the SPE extract comprises 50 vol % to 100 vol % of an organic solvent, wherein the analyte is a steroid, preferably selected from the group consisting of testosterone and estradiol:
   b) concentrating the analyte, said concentrating comprising partially evaporating the solvent from the SPE-extract obtained in a); wherein the volume of the SPE-extract subjected to the partial evaporation is reduced by 50% to 95%, preferably by 60% to 90%, more preferably by 70% to 80%;
   b1) diluting the concentrated analyte obtained from step b) with a dilution solvent to obtain a diluted analyte, w % herein the diluted analyte comprises less than 50 vol % of the organic solvent or a further organic solvent prior to step c), and c) detecting and/or quantifying the analyte in the sample using mass spectrometry, wherein the mass spectrometry is mass spectrometry coupled to liquid chromatography (LC-MS).

In a preferred aspect, the present invention relates to a method for detecting and/or quantifying an analyte of interest in a sample using mass spectrometry, said method comprising:

a) extracting the analyte from the sample using solid phase extraction (SPE) so as to obtain an SPE extract comprising the analyte.

b) concentrating the analyte by partially evaporating solvent from the SPE-extract obtained in a), and c) detecting and/or quantifying the analyte in the sample using mass spectrometry.

As demonstrated by the appended examples the method of the invention, the inventors surprisingly found that applying partial evaporation on SPE extracts comprising the analyte of interest (e.g. a steroid and in particular an androgen or estrogen), the analyte recovery in the MS sample preparation workflow can be increased versus previously used dilution workflows. Further, the inventors demonstrated that partial evaporation of SPE extracts is surprisingly superior in sample recovery, and thus detection sensitivity of analytes (e.g. steroids and in particular androgens or estrogens), compared to using full evaporation to dryness and subsequent reconstitution in a defined volume. Besides this advantage of higher analyte recovery and detection sensitivity, partial evaporation has the advantage of being much faster than full evaporation. Thus shortening the time for evaporation of solvent shortens the overall sample preparation time. Short sample preparation times allow a higher sample turnover and become of particular importance when talking about fully automated MS sample preparation and measurement systems which are typically required to have a sample throughput as high as possible.

"Concentrating the analyte by partially evaporating solvent from the SPE-extract" means that the SPE extract is subjected to evaporation such that the volume is reduced and the concentration of the analyte in the obtained solution is increased relative to the concentration of the analyte in the SPE extract.

"Partial evaporation" as used herein means that the solvent of a liquid sample (herein the SPE extract/eluate) is not evaporated to complete dryness but such that a part of the solvent remains. In other words, the solvent of the liquid sample subjected to evaporation (herein the SPE extract/eluate) is not fully evaporated.

"Evaporating the solvent" means that liquid is evaporated in a manner that the analyte does not evaporate. Preferably, the analyte does also not precipitate during the evaporation.

The partial evaporation according to the invention is configured to increase analyte concentration. Moreover, the partial evaporation is preferably configured to reduce the content of organic solvents (e.g. volatile organic solvents such as acetonitrile or methanol). Reduction in the content of organic solvent(s) in the SPE extract improves LC performance in LC-MS.

In embodiments, the method is performed in the following order: a), then b) and then c).

In embodiments, the method is performed in the following order: a), then b), then b1) and then c).

In embodiments, the settings of the partial evaporation (e.g. temperature and/or vacuum settings) may be configured such that organic solvents (e.g. acetonitrile or methanol) evaporate. In embodiments, the settings of the partial evaporation may be selected such that organic solvents evaporate preferentially over other solvents such as water. Solvents with higher vapor pressures or lower boiling points (e.g. acetonitrile and methanol) in aqueous mixtures evaporate faster than the water content close to or above the boiling point (combination of temperature and pressure). Thereby, the relative organic content is effectively reduced by evaporation.

The concentration step has the advantage that the concentration of the analyte is increased for the mass spectrometry analysis such that a lower limit of quantification regarding analyte concentration in the sample can be improved. Especially, by combining SPE and the concentration comprising partial evaporation, surprisingly a signal increase could be achieved. The increase in the concentrations of the analyte by the concentration step also allows using lower sample volumes for a given limit of quantification and increases the amount analyte subjected to mass spectrometry in a defined volume. Moreover, analyte concentration using partial evaporation of solvent has the advantage that volatile solvents such as organic solvents comprised in the SPE extract (e.g. ACN or methanol that may be used for extracting the analyte from the solid phase) may be removed. Such organic solvents can interfere with the liquid chromatography of a LC comprising mass spectrometry workflow.

Evaporation or partial evaporation may be achieved with different evaporation systems or chambers known in the art. The evaporation system or chamber may be part of the mass spectrometry system. The evaporation may be conducted fully automated. i.e. without manual handling steps. In embodiments, an evaporation system that does not use centrifugation may be employed. In a preferred embodiment, the evaporation system may use vacuum and heating for evaporation (e.g. SpeedVac Vacuum Concentrator, ThermoFisher).

In embodiments, the volume of the SPE-extract subjected to concentration by evaporation is reduced by 50% to 95%, in particularly 60% to 90% and in particular by 70% to 80% (relative to the SPE extract volume subjected to concentration/evaporation). In particular, the SPE extract may be concentrated by reducing the solvent volume by 73% to 87% using evaporation. It is demonstrated in the appended Example 1 that using such extent of concentration/evaporation of solvent from the SPE extract, an increased analyte recovery and detection sensitivity for the analyte can be achieved vis-n-vis dilution workflows and also full evaporation workflows.

For example, when a magnetic particle based SPE is conducted and a total SPE extract of 150 µl is obtained, the magnetic particles may be pelleted, 130 µl of the SPE extract may be transferred to a separate tube and may be subjected to evaporation. A reduction of the subjected volume of 130 µl of the SPE extract to a volume of 20 µl, for example, corresponds to a reduction of the volume by 84.6%.

In embodiments, the volume of the SPE-extract subjected to evaporation may be reduced by at least 50%, at least 55%, at least 60%, at least 65%, at least 70%, at least 75%, at least 80%, at least 85%, at least 90%, or at least 95% by the evaporation.

In embodiments, the volume of the SPE-extract subjected to evaporation may be reduced by at most 50%, at most 55%, at most 60%, at most 65%, at most 70%, at most 75%, at most 80%, at most 85%, at most 90%, at most 95%, or at most 99% by the evaporation.

In embodiments, the volume of the SPE-extract subjected to evaporation is reduced to a final volume of 5% to 50%, in particular to 10% to 40%, in particular 20% to 30% by evaporation. In particular, the SPE extract may be concentrated by evaporation reducing the solvent volume to a final volume of 13% to 27%.

In embodiments, the method may comprise adjusting the volume after evaporation using a diluent solution to a final volume subject to LC-MS. The final volume after adjustment with the diluent solution may correspond to 5% to 40%, in an embodiment 10% to 30%, or in an embodiment 13% to 27% of the volume of the sample subjected to the SPE. Exemplary but non-limiting, a SPE extract volume of 130 µl may be subjected to the step of concentrating the analyte using evaporation, the volume may be reduced to 10 µl by said concentrating and finally the volume may be adjusted to 40 µl using a diluent solution.

In embodiments, the volume obtained after evaporating solvent from the SPE extract may be adjusted by addition of a diluent solution such that the final volume obtained corresponds to the injection volume to the LC and optionally a dead volume of the reaction vessel in which the solution is comprised. For example, the volume obtained after evaporating solvent from the SPE extract may be adjusted by addition of a diluent solution such that it is possible to remove 15-30 µl or in particular 20 µL for injection to the LC from the reaction vessel used.

The diluent solution used in the context of the present disclosure may be, for example, an aqueous solution or water. Preferably, an aqueous solution used as diluent solution comprises organic solvent concentrations of 20 vol % or lower, preferably 10 vol % or lower, even more preferably 5 vol % or lower and most preferably 0 vol %. In embodiments, the diluent solution may be water. Using low concentrations of organic solvents or even no content of organic solvents has the advantage that the organic solvent content can kept low, which is advantageous when subjecting the concentrated solution to LC-MS. To high concentrations of organic solvent typically cause peak broadening in LC, especially when using hydrophobic LC stationary phases such as C18 matrix.

The method of the present invention is applicable to different analytes and samples. The method may comprise detecting and/or quantifying only the analyte of interest or the analyte of interest and, in addition, further analytes may be detected.

In embodiments, the analyte of interest detected and/or quantified by the method of the present invention, may be a steroid, in particular a steroid hormone. In particular, the analyte may be a steroid selected from the group consisting of an androgen, an estrogen, a glucocorticoid, a mineralocorticoid, a gestagen.

Exemplary but non-limiting examples for an androgen are testosterone, dehydroepiandrosterone (DHEA), dehydroepiandrosterone sulfate (DHEA-S), androstenedione (A4), androstenediol (A), dihydrotestosterone (DHT) and androsterone.

In specific embodiments, the androgen is testosterone.

Exemplary but non-limiting examples for an estrogen are estrone (E1), estradiol (E2) estriol (E3) and estetrol (E4).

In specific embodiments, the estrogen is estradiol.

An exemplary but non-limiting example for a glucocorticoid is cortisol.

An exemplary but non-limiting example for a mineralocorticoid is aldosterone.

Exemplary but non-limiting examples for a gestagen are progesterone (P4), 16α-hydroxyprogesterone, 17α-hydroxyprogesterone, 20α-dihydroprogesterone, 20β-dihydroprogesterone, 5α-dihydroprogesterone, 5α-dihydroprogesterone, 3β-dihydroprogesterone, 11-deoxycorticosterone and dihydrodeoxycorticosterone.

In embodiments, the analyte is a steroid selected from the group consisting of: 11 desoxycortisol, 17-alpha-hydroxyprogesterone (17OHP), 21-desoxycortisol, aldosterone, androstenedione (A4), cortisol, cortisone, dehydroepiandrosterone (DHEA), dehydroepiandrosterone sulfate (DHEAS), dihydrotestosterone (DHT), estradiol (E2), progesterone, testosterone (T). In preferred embodiments, the analyte is selected from aldosterone, androstenedione (A4), dehydroepiandrosterone, dihydrotestosterone (DHT), estradiol (E2), progesterone or testosterone (T). In a particularly preferred embodiment, the analyte is testosterone (T) or estradiol (E2).

The method of the invention uses a previously obtained sample. Thus, the method of the invention is an in vitro method. The sample may in particular be a sample obtained from a human individual.

In principle, any sample that comprises or is suspected to comprise the analyte of interest may be subjected to the method of the invention. While a sample subjected to solid phase extraction needs to be liquid, in principle also solid samples (e.g. dried blood spots) can be subjected to the method of the invention. For solid samples, an additional sample preparation step prior to SPE is included, which comprises reconstituting the dried blood spot in a liquid. Respective methods and means for reconstituting a solid sample into a liquid such that analytes (e.g. steroids) are recovered in a liquid are known in the art (Rossi et al., Clin Chem Lab Med 2011; 49(4): 677-684: Kim et al., Ann Lab Med 2015:35 578-585).

In embodiments, the sample may be a liquid sample. e.g. a biological fluid. In particular embodiments, the sample may be a body fluid. Exemplary but non-limiting examples for body fluids are whole blood, serum, plasma, urine, seminal fluid, (female) follicular fluid and salvia. In particular, the sample may be a blood sample selected from whole blood, serum and plasma. In specific embodiments, the sample may be serum or plasma. Depending on the sample type used a sample preparation step may be required before subjecting the sample to SPE and the amount of sample may need to be adjusted. A skilled person in the art is aware how to conduct such sample preparation.

The sample volume subjected to the SPE can be varied depending on the sample type and the type and/or concentration of the analyte to be detected in the sample. Low sample volumes have the advantage to reduce the reagent volumes for the analysis and the total analysis time (e.g. by reducing the time for liquid chromatography etc.) and offer the opportunity to subject extra sample material to different analyses. The combination of SPE extraction and the concentration step of the method of the present invention contribute to an increased sensitivity and, thus, that sample volumes can be kept low.

For instance, the sample volume may be 250 µl or less, in an embodiment 200 µl or less, in an embodiment 150 µl or less, in an embodiment 150 µl. In embodiments, a sample volume of 150 µl to 250 µl or more particularly 150 µl to 200 µl may be used. In specific embodiments, the sample volume may be 150 µl.

Depending on the sample type and analyte, a fraction of the analyte may form a complex with one or more proteins (e.g. steroid may be bound to a steroid binding protein and/or sex hormone-binding globin) or other sample constituents (e.g. serum constituents or albumin). The method of the invention may comprise a step of releasing the analyte to be detected and/or quantified from binding partners such as proteins (e.g. sex hormone-binding globin). The releasing step may in particular be conducted prior to the SPE. Performing a releasing/pretreatment step can enhance the availability of one or more steroids for the detection and/or quantification. The pretreatment step may be a "deproteinization" step, i.e. a step that releases the some or all of the one or more steroids from one or more proteins to which they are bound.

The pretreatment/releasing step may comprise adding a releasing agent (e.g. deproteinization agent) to the sample. A releasing agent (e.g. deproteinization agent) is an agent that releases the one or more steroids from its binding partner(s) in the sample (proteins such as sex hormone-binding globin and/or other constituents of the sample) when added to a sample. In some embodiments, a releasing composition (e.g. deproteinization composition) may be used. A releasing composition (e.g. deproteinization composition) is a mixture of two or more substances comprising at least one agent that triggers release of the one or more steroids from its binding partner(s) (proteins such as sex hormone-binding globin and/or other constituents of the sample) when added to the sample. Deproteiniziation agents and compositions as well as techniques using the same are known in the art. In the context of the present disclosure a releasing agent (e.g. deproteinization agent) may be, for example, an organic solvent such as, for example, an organic solvent selected from acetonitrile (ACN), methanol (MeOH), and dimethylsulfoxid (DMSO). Exemplary but non-limiting releasing compositions (e.g. deproteinization compositions) include but are not limited to mixtures comprising at least two from the group of acetonitrile (ACN), methanol (MeOH), and dimethylsulfoxid (DMSO). The volume of the releasing agent (e.g. deproteinization agent) and/or releasing composition (e.g. deproteinization composition) added to the sample may be adjusted depending on the agent and/or agent composition and the type of binding that it should interfere with. For instance, ACN may be added to the sample such that a final concentration of 1 to 10 vol %, in particular 2 to 5 vol % and in particular about 2 vol % or exactly 2 vol % MeOH may, for example, be added to the sample to the sample at a final concentration of 2.5-30 vol %, in particular 5-15 vol % and in particular 7.5 vol % DMSO may be added to the sample at a final concentration of 2-20 vol %, in particular 3-10 vol % and in particular 5 vol %. The pretreatment step in the context of the invention may further or alternatively involve lowering or increasing the µl of the sample. It is known in the art that a change in pH can interfere with binding of steroids to sample constituents. For instance the pH may be acidified to a pH of 5 or lower, in particular 4 or lower, in particular 3 or lower and in particular 2 or lower.

In preferred embodiments, the method of the invention may comprise a pretreatment step prior to step a) comprising adding an organic solvent as releasing agent (e.g., at neutral pH). For instance, the organic solvent acetonitrile (ACN) may be added to the sample at a final concentration as indicated above.

In embodiments, also pretreatment conditions as known in the art may be employed. Non-limiting examples for pretreatment conditions are described in Gervasoni, J., et al (Clin Biochem, 2016, 49(13-14): p 998-1003), which is herein incorporated by reference in its entirety.

The method of the invention comprises the step of "extracting the analyte from the sample using solid phase extraction (SPE) so as to obtain an SPE extract comprising the analyte". "Extracting the analyte from the sample" means that the sample complexity is reduced; i.e. that the analyte is separated or purified partially or fully from other sample constituents. The reduction of sample complexity by the extraction facilitates mass spectrometry analyzes and reduces background signal. In embodiments, the step of "extracting the analyte from the sample" may be also referred to as "enriching the analyte from the sample" "Enriching" in this context means that a SPE extract is generated in which the amount(s) of the analyte is increased relative to other sample constituents. In embodiments, the abundance of the analyte relative to at least one other sample constituent may be increased. "Solid phase extraction" (SPE) as used in the context of the present invention refers to a method that partially or fully separates the analyte or a group of analytes from other constituents comprised in a liquid mixture and/or sample. The SPE method relies on a differential solid phase and liquid phase distribution of the analyte(s) and one or more of the other compounds comprised in a mixture and/or sample. In a first embodiment of solid phase extraction according to the present disclosure, the analyte(s) may have higher binding affinity to a solid phase than one or more of the other compounds in a mixture or sample. By the higher binding affinity of analyte(s) to the solid phase the analyte(s) may be partially or fully separated, i.e. extracted, from the other compounds of the mixture and/or sample. In a second alternative embodiment, the analyte may have a binding affinity to a solid phase that is lower than the binding affinity of one or more other compounds comprised in the mixture and/or sample subjected to solid SPE. In this embodiment, the one or more steroids remain in the liquid phase and one or more other sample constituents are removed by binding to the solid phase. Accordingly, the term solid phase extraction, as used herein, includes different embodiments, such as: (i) retention of the analyte(s) on a solid phase that allows partial or full removal of other compounds with the liquid phase (optionally also with one or more wash steps) and (ii) retention of other compounds on the solid phase and extraction of the analyte in the liquid phase. In the embodiments (i). SPE typically involves an elution using a suitable elution solution to release the reversibly bound analyte(s) from the solid phase. The elution solution can be selected dependent on the binding principle of the solid phase.

The "solid phase extraction" as used in the context of the present invention includes but is not limited to techniques such as classical solid phase extraction methods using a solid phase extraction cartridge/column or a solid phase tip. In particular, the term "solid phase extraction" in the context of the invention includes particle-based in particular bead based workflows. The term "solid phase extraction" in the context of the present disclosure includes different separation principles. In embodiments, the analytes (i.e. the one or more steroids) may be retarded by the solid phase (e.g. beads) and one or more other sample constituents remain in the liquid phase. In alternative embodiments, the analytes (i.e. the one or more steroids) may remain in the liquid phase and one or more other sample constituents bind to the solid phase.

The "solid phase" used for solid phase extraction in the context of the invention includes but is not limited to a surface or particles (e.g. microparticles such as microbeads). In a particular embodiment, the solid phase may be beads, in particular microbeads. Beads (e.g. microbeads) may be non-magnetic, magnetic, or paramagnetic. In a particularly preferred embodiment, the solid phase may be magnetic microbeads. The beads (e.g. microbeads, in particular magnetic microbeads) may be made of various different materials. The beads (e.g. magnetic beads) may have various sizes (e.g. in the µm range) and comprise a surface with or without pores.

In a particular embodiment of the invention, the solid phase may be a dispensable solid phase. i.e. a solid phase material that can be held in suspension and dispensed. Non-limiting example, for such dispensable solid phases are particles, in particular beads, more particularly microbeads and even more particularly magnetic microbeads. A dispensable solid phase has the advantage that it can be efficiently used in a random access mode on an automated sample preparation and mass spectrometry analyser, which may require using different solid phases for different analytes. Moreover, the amount of a dispensable solid phase material can be more easily adjusted.

The solid phase (e.g. particles, particularly magnetic particles, particularly magnetic microbeads) may be coated in a manner that allows binding/capturing of the analyte. Suitable coatings for capturing/binding the one or more steroids are known in the art.

In embodiments, the solid phase (e.g. particles, particularly magnetic particles, particularly magnetic microbeads) may be coated with antibodies or fragments thereof specifically binding to the analyte. Ina particular embodiment, immunobeads (i.e. magnetic particles such as microbeads having antibodies or antigen-binding fragments thereof attached to the surface) binding/capturing the analyte may be employed as solid phase for the SPE. In other embodiments, the solid phase may be coated with a porous polymer matrix that allows retardation of the analyte.

In embodiments, particles as described in WO2018189286A1 or WO2019141779A1 may be used for the SPE to capture the analyte (e.g. a steroid) from the sample. These documents and particularly the particles or beads as described therein are incorporated herein in their entirety.

Solid phase extraction in the context of the invention may include flow through based solid phase extraction and batch-type solid phase extraction.

Flow through based solid phase extraction means that the solid phase is retained in a container (e.g. a cartridge) and the sample (or a pretreated sample) is applied to the solid phase in a flow through process. Optionally, a flow through may include a defined incubation time in which the sample is contacted with the solid phase while the flow through is blocked. For example, flow through based solid phase extraction maybe conducted with solid phase extraction cartridge/columns or a solid phase tips. A flow through based solid phase extraction may comprise one or more wash steps in which residual liquid phase is removed "Batch-typed bed solid phase extraction", as used herein, refers to solid phase based separation methods that do not include a flow through step "Batch-type based solid phase extraction" includes bringing the sample (or pretreated sample) into contact with the solid phase and optionally incubating the sample in presence of the solid phase for a defined time (required for analyte binding or binding of one or more other sample constituents depending on the separation principle), and separating the solid phase from the liquid phase by means different from flow through (e.g. pelleting). In particular, batch-type solid phase extraction includes an embodiment in which the solid phase is formed by particles (in particular magnetic particles such as beads) and wherein the separation of the solid phase from the liquid phase during SPE is achieved by pelleting the beads. Pelleting the beads may be achieved by centrifugation or other means. In specific embodiments, pelleting the beads may not involve centrifugation. In a particular preferred embodiment, beads may be magnetic and the beads may be pelleted by magnetic force.

In a particular embodiment, the solid phase used in the SPE may be a batch-type SPE, preferably a batch type SPE using (micro)beads, even more preferably a batch type SPE using magnetic (micro)beads. The batch-type SPE may be based on binding/capturing the analyte to the solid phase used in the SPE. In other embodiments, other sample constituents may bind to the solid phase and the analyte may remain in the liquid phase.

The solution comprising the analyte or the majority thereof obtained by SPE is referred to herein as "SPE extract". Depending on the separation principle employed in the SPE (i.e. retardation of the analyte on the solid phase or in the liquid phase), the "SPE extract" may correspond to the liquid phase of the sample obtained after incubation with the solid phase (since in these embodiments the analyte does not hind to solid phase) or may correspond to the eluate obtained by elution from the solid phase using an elution solvent/solution (in these embodiments the analyte is bound to the solid phase and subsequently eluted). In particular embodiments, the analyte may be retarded on the solid phase and the SPE extract may correspond to eluate obtained by elution from the solid phase using an elution solvent.

In embodiments, the SPE, extract may comprise 50 vol % to 100% vol % of an organic solvent. The organic solvent may be methanol or acetonitrile.

In particular embodiments, the SPE may comprise:
a) binding/capturing the analyte to a solid phase;
b) optionally one or more wash steps, and
c) eluting the analyte from the solid phase, wherein the eluate obtained is referred to as SPE extract and comprises the analyte.

The binding of the analyte to the solid phase may involve incubation of the solid phase with the sample for a pre-defined time under conditions that allow capturing the analyte to be detected.

In particularly preferred embodiments, the SPE may be a magnetic particle based workflow. The magnetic particle based workflow may comprise:
a) binding/capturing the analyte to the magnetic particles;
b) optionally one or more wash steps, and
c) eluting the analyte from the solid phase, wherein the eluate obtained is referred to as SPE extract and comprises the analyte.

The magnetic bead based workstation may further comprise:
d) separating the SPE extract from the beads.

This separating may be achieved by pelleting the magnetic beads (e.g. by magnetic force) in a first reaction vessel and transferring the eluate to another reaction vessel.

Accordingly, in a particular aspect the present invention provides for a method for detecting or quantifying an analyte in a sample using mass spectrometry, wherein said method comprises:
a) extracting the analyte from the sample using a magnetic particle based workflow (e.g. as described elsewhere herein) obtaining an eluate comprising the analyte:
b) concentrating the analyte, in the eluate, said concentrating comprising partially evaporating solvent from the eluate obtained in a), and
c) detecting and/or quantifying the analyte in the sample using mass spectrometry.

In other words, "extracting the analyte from the sample using solid phase extraction (SPE) so as to obtain an SPE extract comprising the analyte" may in embodiments of the invention be "extracting the analyte from the sample using a magnetic particle based workflow obtaining an eluate comprising the analyte".

A "magnetic particle based workflow" refers to a method in which magnetic particles (e.g. magnetic microbeads) are used to extract the analyte from the sample. The magnetic particle may bind the analyte while other sample constituents are partially or fully removed with the liquid phase.

In a particularly preferred embodiments, the present invention employs magnetic particles coated with antibodies or antigen-binding fragments (e.g. multiple copies of one antibody or antigen-fragment) specifically binding to the analyte. These magnetic particles are also referred to as immunobeads herein. Accordingly, in one aspect the present invention relates to a method for detecting or quantifying an analyte in a sample using mass spectrometry, wherein said method comprises.

a) purifying the analyte from the sample using magnetic particles coated with an analyte specific antibody (i.e. immunobeads) so as to obtain an eluate comprising the analyte;
 b) concentrating the analyte, in the eluate, said concentrating comprising partially evaporating solvent from the eluate obtained in a), and
 c) detecting and/or quantifying the analyte in the sample using mass spectrometry (e.g. LC-MS).

The SPE of the method of the invention may comprise one or more wash steps using a wash solution. The method may comprise, for example, one or two wash steps using a wash solution. The wash steps may be conducted after binding/capturing the the analyte to the solid phase and prior to eluting the analyte from the solid phase.

In the embodiments in which the analyte is bound to a solid phase and needs to be eluted to form a SPE extract, this may be achieved with an elution solvent. The elution solvent may be added to the solid phase and the solid phase may be incubated in the presence of the elution solvent. The incubation time may be adjusted depending on which solid phase is used and depending on how harsh the elution solvent is.

The composition of the elution solvent for SPE (also including magnetic particle based workflows) can be selected dependent on the solid phase, analyte and the interaction principle between the analyte and the solid phase.

In embodiments, the elution solvent may comprise acetonitrile (ACN), in particular at a concentration of 40-100 vol %, in particular 45-90 vol %, in particular 50-70 vol %, in particular 60 vol %. The aforementioned ACN based elution solvents may especially be employed in embodiments using particles, such as the magnetic particles disclosed herein elsewhere. These elution solvents may in particular also be used when immunobeads are employed.

In embodiments, the elution solvent may comprises methanol, in particular at a concentration of 60-100 vol %, in particular 70-90 vol %, in particular 80 vol %. The elution solvent may be a mixture of methanol and water. The aforementioned methanol based elution solvents may especially be employed in embodiments using particles, such as the magnetic particles disclosed herein elsewhere. These elution solvents may in particular also be used when immunobeads are employed.

The method of the invention may comprise using one or more internal standards (ISTD), in particular isotope labeled internal standards. ISTDs may be used for quantification of the analytes. The one or more internal standards are preferably added to the sample in a predefined and known amount prior to SPE and the optional pretreatment step.

An "internal standard (ISTD)" is typically a compound that exhibits similar physicochemical properties as the analyte of interest when subjected to the mass spectrometric detection workflow (i.e. including any pre-treatment, enrichment and actual detection step). Moreover, an ISTD is typically selected such that it does not naturally occur in the samples to be measured in significant amounts (e.g. 1% or less of the amounts of the analyte). Although the ISTD exhibits similar or identical chemical properties as the analyte of interest, it is still clearly distinguishable from the analyte of interest by mass spectrometry. Exemplified, during chromatographic separation, such as gas or liquid chromatography, the ISTD has about the same retention time as the analyte of interest from the sample. Thus, both the analyte and the ISTD enter the mass spectrometer at the same time. The ISTD however, exhibits a different molecular mass than the analyte of interest from the sample. This allows a mass spectrometric distinction between ions from the ISTD and ions from the analyte by means of their different mass/charge (m/z) ratios. Both are subject to fragmentation and provide daughter ions. These daughter ions can be distinguished by means of their m/z ratios from each other and from the respective parent ions. Consequently, a separate determination and quantification of the signals from the ISTD and the analyte can be performed. Since the ISTD has been added in known amounts, the signal intensity of the analyte from the sample can be attributed to a specific quantitative amount of the analyte. Thus, the addition of an ISTD allows for a relative comparison of the amount of analyte detected, and enables unambiguous identification and quantification of the analyte of interest present in the sample when the analyte reach the mass spectrometer. Typically, but not necessarily, the ISTD is an isotopically labelled variant (comprising e.g. at least three of $^{2}H$, $^{13}C$, and/or $^{15}N$ etc. label) of the analyte of interest.

An exemplary but non-limiting ISTD for quantifying testosterone is 13C3-Testosterone (e.g. available from Cerilliant). An exemplary but non-limiting ISTD for quantifying estradiol is 13C3-Estradiol (e.g. available from Cerilliant).

The mass spectrometry analysis may involve liquid chromatography (LC). In particularly preferred embodiments, the mass spectrometry analysis may be LC-MS or LC-MS-MS.

In embodiments, liquid chromatography may be high-pressure liquid chromatography (HPLC). The HPLC may be based on different column materials known in the art. The flow rate of the HPLC can be adapted depending on the analyte and needs. In specific embodiments, the flow rate of the HPLC may be 0.20-1.0 ml/min, in particular 0.44 ml/min.

In some embodiments, the liquid chromatography of the mass spectrometry analysis may be rapid LC.

In some embodiments the liquid chromatography of the mass spectrometry analysis may be micro LC.

In some embodiments, the liquid chromatography of the mass spectrometry analysis may be UHPLC. e.g. UHPLC using a micro LC.

In embodiments, the HPLC separation principle may be a reversed phase HPLC (RP-HPLC). RP-HPLC may be but is not limited to a C18-HPLC.

Ionization in the mass spectrometry analysis may be based on different techniques as described elsewhere herein. In one embodiment, electrospray ionization (ESI).

The MS device used for the mass spectrometry analysis may be a tandem mass spectrometer, in particular a triple quadrupole device.

In a particular embodiment, the method of the invention may be automated. "Automated" means that except for the step of applying the sample and reagents to the system one or less, preferably no manual handling steps are required manual handling steps include in particular the manual addition of a reagent to the sample and the transfer of the sample during processing from one device to another.

In embodiments, the method of the invention may not comprise a centrifugation step. In particular, the SPE and/or the concentration may be conducted without centrifugation. Preventing a centrifugation step (e.g. by using a magnetic bead based SPE workflow) has the advantage that it can be automated easier and that a sample preparation system does not require a centrifuge. Further, the time for separating solid phase during SPE may be reduced.

In embodiments, the method of the invention may not comprise liquid-liquid extraction, in particular not in the sample preparation. In other words, the SPE and the concentration steps may be the only sample preparation steps before mass spectrometry (e.g. LC-MS, in particular LC-MS/MS). Liquid-liquid extraction steps, are typically cumbersome and consume organic solvents.

The method of the invention may in particular be performed in a random-access compatible mode and using a random access compatible system. "Random-access" preferably means that the reagents and system settings of the described invention are compatible with other assays addressing different analytes without the need of system adaptation or equilibration, in particular manual system adaptation or equilibration (including changes to the mass spectrometry and/or LC settings).

The mass spectrometry analysis of the method of the invention may be conducted using a Multiple Reaction Monitoring (MRM) mode.

In one aspect, the present invention also provides for a method for preparing a sample for a mass spectrometry analysis (e.g. LC-MS/MS) detecting and/or quantifying an analyte, said method comprising.
a) extracting the analyte from the sample using solid phase extraction (SPE) so as to obtain an SPE extract comprising the analyte;
b) concentrating the analyte, said concentrating comprising evaporating solvent from the SPE-extract obtained in a).

What has been said above with respect to the method for detecting and/or quantifying the analyte applies mutatis mutandis to the method for preparing a sample for a mass spectrometry analysis (e.g. LC-MS/MS) detecting or quantifying the analyte.

The term "mass spectrometry" ("Mass Spec" or "MS") relates to an analytical technology used to identify compounds by their mass. MS is a method of filtering, detecting, and measuring ions based on their mass-to-charge ratio, or "m/z". MS technology generally includes (1) ionizing compounds to form charged compounds, and (2) detecting the mass-to-charge ratio. The compounds may be ionized and detected by any suitable means. A "mass spectrometer" generally includes an ionizer and an ion detector. In general, one or more molecules of interest are ionized, and the ions are subsequently introduced into a mass spectrographic instrument where, due to a combination of magnetic and electric fields, the ions follow a path in space that is dependent upon mass ("m") and charge ("z"). The term "ionization" or "ionizing" refers to the process of generating an analyte ion having a net electrical charge equal to one or more electron units. Negative ions are those having a net negative charge of one or more electron units, while positive ions are those having a net positive charge of one or more electron units. The MS method may be performed either in "negative ion mode", wherein negative ions are generated and detected, or in "positive ion mode" wherein positive ions are generated and detected.

"Tandem mass spectrometry" or "MS/MS" involves multiple steps of mass spectrometry selection and detection, wherein fragmentation of the analyte occurs in between the steps. In a tandem mass spectrometer, ions are formed in the ion source and separated by mass-to-charge ratio in the first stage of mass spectrometry (MS1). Ions of a particular mass-to-charge ratio (precursor ions or parent ions) are selected and fragment ions (also referred to as daughter ions) are created by collision-induced dissociation, ion-molecule reaction, and/or photodissociation. The resulting ions are then separated and detected in a second stage of mass spectrometry (MS2).

Typically, for the mass spectrometry measurement, the following three steps are performed:
(1.) a sample comprising an analyte of interest is ionized, usually by adduct formation with cations, often by protonation to cations. Ionization sources include but are not limited to electrospray ionization (ESI) and atmospheric pressure chemical ionization (APCI)
(2.) the ions are sorted and separated according to their mass and charge. High-field asymmetric-waveform ion-mobility spectrometry (FAIMS) may be used as ion filter
(3.) the separated ions are then detected, e.g. in multiple reaction mode (MRM), and the results are displayed on a chart.

The term "electrospray ionization" or "ESI." refers to methods in which a solution is passed along a short length of capillary tube, to the end of which is applied a high positive or negative electric potential. A solution reaching the end of the tube is vaporized (nebulized) into a jet or spray of very small droplets of solution in solvent vapor. This mist of droplets flows through an evaporation chamber, which is heated slightly to prevent condensation and to evaporate solvent. As the droplets get smaller the electrical surface charge density increases until such time that the natural repulsion between like charges causes ions as well as neutral molecules to be released.

The term "atmospheric pressure chemical ionization" or "APCI," refers to mass spectrometry methods that are similar to ESI; however, APCI produces ions by ion-molecule reactions that occur within a plasma at atmospheric pressure. The plasma is maintained by an electric discharge between the spray capillary and a counter electrode. The ions are typically extracted into the mass analyzer by use of a set of differentially pumped skimmer stages. A counterflow of dry and preheated N2 gas may be used to improve removal of solvent. The gas-phase ionization in APCI can be more effective than ESI for analyzing less-polar entity.

"Multiple reaction mode" or "MRM" is a detection mode for a MS instrument in which a precursor ion (also referred to as parent ion) and one or more fragment ions are selectively detected and/or quantified.

Since a mass spectrometer separates and detects ions of slightly different masses, it easily distinguishes different isotopes of a given element. Mass spectrometry is thus, an important method for the accurate mass determination and characterization of analytes, including but not limited to low-molecular weight analytes, peptides, polypeptides or proteins. Its applications include the identification of proteins and their post-translational modifications, the elucidation of protein complexes, their subunits and functional interactions, as well as the global measurement of proteins in proteomics. De novo sequencing of peptides or proteins by mass spectrometry can typically be performed without prior knowledge of the amino acid sequence.

Mass spectrometric determination may be combined with additional analytical methods including chromatographic methods such as gas chromatography (GC), liquid chromatography (LC), particularly HPLC, and/or ion mobility-based separation techniques.

In the context of the present disclosure, the sample may be a sample derived from an "individual" or "subject". Typically, the subject is a mammal mammals include, but are not limited to, domesticated animals (e.g., cows, sheep, cats, dogs, and horses), primates (e.g., humans and non-human primates such as monkeys), rabbits, and rodents (e.g., mice and rats). In preferred embodiments, the sample is obtained from a human.

The term "chromatography" refers to a process in which a chemical mixture carried by a liquid or gas is separated into components as a result of differential distribution of the chemical entities as they flow around or over while interacting with a stationary liquid or solid phase.

The term "liquid chromatography" or "LC" refers to a process of selective retardation of one or more components of a fluid solution as the fluid uniformly percolates through a column of a finely divided substance, or through capillary passageways.

The retardation results from the distribution of the components of the mixture between one or more stationary phases and the bulk fluid, (i.e., mobile phase), as this fluid moves relative to the stationary phase(s). Methods in which the stationary phase is more polar than the mobile phase (e.g., toluene as the mobile phase, silica as the stationary phase) are termed normal phase liquid chromatography (NPLC) and methods in which the stationary phase is less polar than the mobile phase (e.g., water-methanol mixture as the mobile phase and C18 (octadecylsilyl) as the stationary phase) are termed reversed phase liquid chromatography (RPLC).

"High performance liquid chromatography" or "HPLC" refers to a method of liquid chromatography in which the degree of separation is increased by forcing the mobile phase under pressure through a stationary phase, typically a densely packed column. Typically, the column is packed with a stationary phase composed of irregularly or spherically shaped particles, a porous monolithic layer, or a porous membrane. HPLC is historically divided into two different sub-classes based on the polarities of the mobile and stationary phases, namely NP-HPLC and RP-HPLC.

Micro LC refers to a HPLC method using a column having a narrow inner column diameter, typically below 1 mm, e.g. about 0.5 mm. "Ultra high performance liquid chromatography" or "UHPLC" refers to a HPLC method using a high pressure of e.g. 120 MPa (17,405 lbf/in$^2$), or about 1200 atmospheres.

Rapid LC refers to an LC method using a column having an inner diameter as mentioned above, with a short length <2 cm, e.g. 1 cm, applying a flow rate as mentioned above and with a pressure as mentioned above (Micro LC. UHPLC). The short Rapid LC protocol includes a trapping/wash/elution step using a single analytical column and realizes LC in a very short time <1 min.

Further well-known LC modi include Hydrophilic interaction chromatography (HIC), size-exclusion LC, ion exchange LC, and affinity LC.

LC separation may be single-channel LC or multi-channel LC comprising a plurality of LC channels arranged in parallel. In LC, analytes may be separated according to their polarity or log P value, size or affinity, as generally known to the skilled person.

As used herein "detecting" or "to detect" the analyte in a sample at least means to determine whether the analyte is present or absent in the sample. Detecting an analyte may or may not include quantifying said analyte, i.e. determining the absolute or relative amount of the analyte.

As used herein "quantifying" or "to quantify" the analyte in a sample means to determine the presence and amount of said analyte in the sample. The amount may be an absolute or relative amount of the analyte in the sample. The absolute amount can be any quantitative measure such as, for example, a concentration or mass. The relative amount may be any relative quantitative measure. For instance, the amount of the analyte may be detected relative to the amount of another sample ingredient, an internal standard added to the sample or a reference sample comprising the same one or more analyte.

"Final concentration" as used herein in the context of adding an agent and/or composition to a sample refers to the concentration of the agent and/or composition in the mixture obtained by adding said agent and/or composition to the sample.

The term "solvent" includes any solvent or mixture of solvent that keeps the analytes of interest (e.g. the one or more steroids) in solution. Exemplary but non-limiting examples for solvents or components of mixtures of solvents are water, alcohols (e.g. methanol or ethanol) and acetonitrile.

"Steroids" are a group of molecules known in the art. A steroid is a compound with a core structure of typically four rings, also referred to as steroid rings A, B, C and D. The core ring structure of steroids is typically composed of seventeen carbon atoms, which are bonded in four fused rings: three six C-atom cyclohexane rings (rings A, B and C) and one five C-atom cyclopentane ring (ring D). Steroids vary by the functional groups attached to its four rings and by the oxidation state of the rings.

Some steroids also comprise changes to the ring structure in that one of the four rings is open.

The word "comprise", and variations such as "comprises" and "comprising", will be understood to imply the inclusion of a stated integer or step or group of integers or steps but not the exclusion of any other integer or step or group of integers or steps.

As used in this specification and the appended claims, the singular forms "a", "an", and "the" include the respective terms also in plural, unless the content clearly dictates otherwise.

Further, as used in the following, the terms "particularly", "more particularly", "specifically". "more specifically" or similar terms (e.g. preferably or more preferably) are used in conjunction with features of particular or alternative embodiment(s), without restricting alternative possibilities. The disclosed method/system may, as the skilled person will recognize, be performed by using alternative features. Similarly, features introduced by "in an embodiment of the disclosed method/system", "in embodiments" or similar expressions are intended to be additional and/or alternative features, without any restriction regarding alternative embodiments, without any restrictions regarding the scope of the disclosed method/system and without any restriction regarding the possibility of combining the features introduced in such way with other optional or non-optional features of the disclosed method/system.

Percentages, concentrations, amounts, and other numerical data may be expressed or presented herein in a "range" format. In the context of the present disclosure is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "4% to 20%" should be interpreted to include not only the explicitly recited values of 4% to 20%, but to also include individual values and sub-ranges within the indicated range. Thus, included in this numerical range are individual values such as 4, 5, 6, 7, 8, 9, 10, . . . 18, 19, 20% and sub-ranges such as from 4-10%, 5-15%, 10-20° %, etc. This same principle applies to ranges reciting minimal or maximal values. Furthermore, such an interpretation should apply regardless of the breadth of the range or the characteristics being described.

The term "about" when used in connection with a numerical value is meant to encompass numerical values within a range having a lower limit that is 5° smaller than the indicated numerical value and having an upper limit that is 5% larger than the indicated numerical value.

In the present disclosure reference to solvents and solutions is sometimes made by %, (v/v) % or vol % of a certain compound. Whenever it is not specified otherwise the solution or solvent is an aqueous solution. For example, 80% MeOH, 80(v/v) % or 80 vol % MeOH refer to an aqueous mixture comprising 80 volume percent of MeOH.

The following examples and figures are provided to aid the understanding of the present invention, the true scope of which is set forth in the appended claims. It is understood that modifications can be made in the procedures set forth without departing from the spirit of the invention.

EXAMPLES

Materials and Methods

Production of Analyte Specific Magnetic Immunobeads

Figure 1:
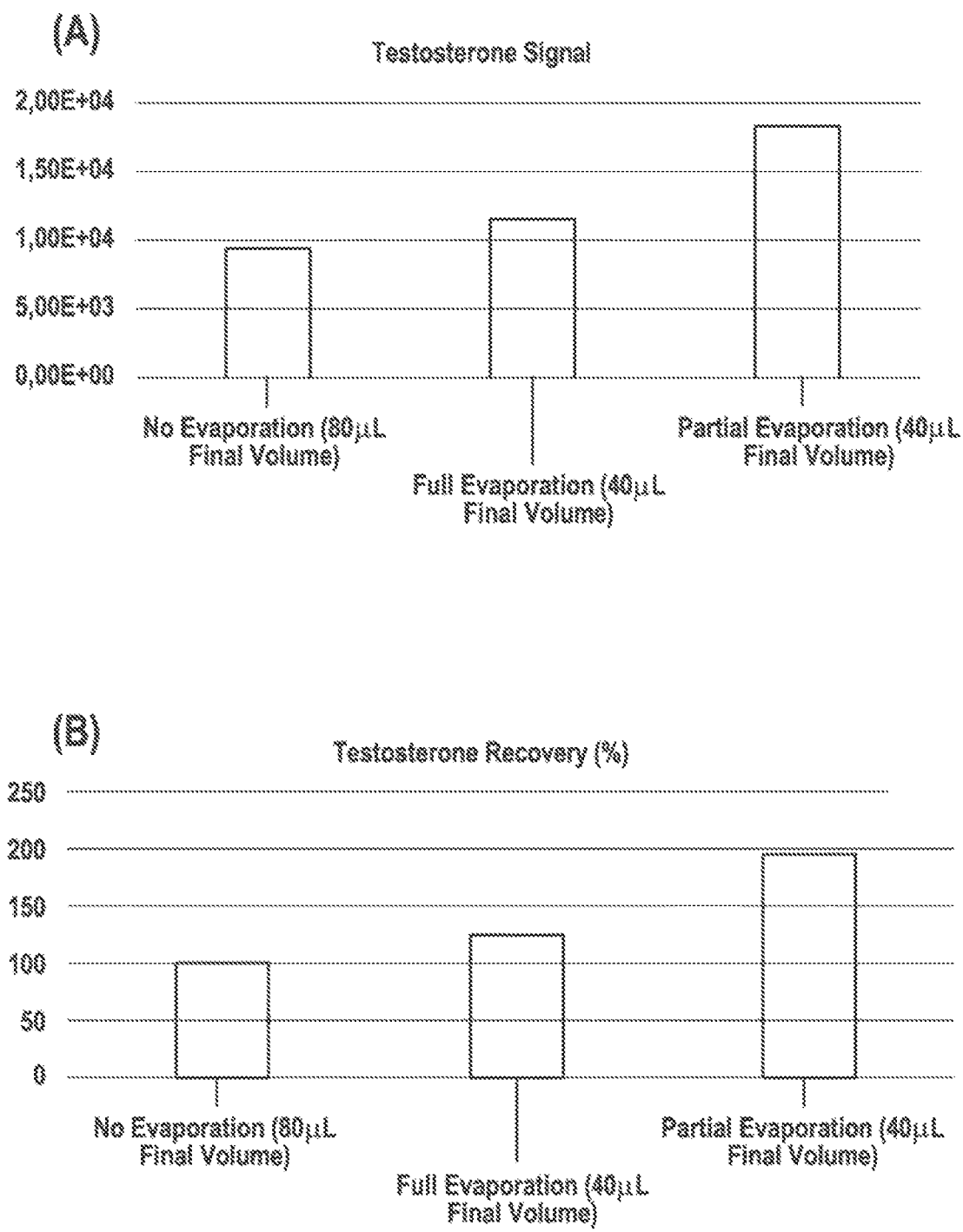
FIG. 1: Comparison of analyte signal (A) and recovery (B) for the analyte testosterone using no evaporation (simple dilution), full evaporation, and partial evaporation workflows. Samples containing 60 pg/mL. Testosterone in 60% MeOH were distributed into three test groups of 40 µl, aliquots. For the first test group, the samples were diluted with 40 µL of H2O to a total final volume of 80 µl, to serve as the control test group (100% recovery). For the second and third test groups, the samples w % ere either evaporated to complete dryness (full evaporation) and then reconstituted with 40 µL of 30% MeOH or evaporated down to 10 µL volume (partial evaporation) and then diluted with 30 µL of 30% MeOH to a total final volume of 40 µL. All samples contained the same amount of analyte and a final organic content of 30% MeOH.

To produce magnetic beads coated with analyte specific antibodies (immunobeads), an Elecsys® streptavidin bead suspension was used and the beads were coated with analyte specific antibodies. For the coating, the magnetic beads (1 mg/ml) were separated using magnetic separation, the beads were washed with PBS buffer and vortexed. The washing was repeated twice. After the final wash step the supernatant was removed and a solution comprising the biotin-labeled antibody directed to an analyte were added to the beads. The respective anti-analyte antibody solution (50 µg/ml) was added at a volume equal to the volume of the beads and the mixture was incubated over night at 4° C. Finally, three wash steps using PBS were conducted to remove unbound antibodies. The washed beads were resuspended in a volume equivalent to the original volume of beads to ensure a final concentration of 1 mg/mL.

For the production of testosterone-specific magnetic immunobeads a biotin-labeled monoclonal anti-testosterone antibody was coupled to the beads. For the production of estradiol-specific magnetic immunobeads a biotin-labeled monoclonal anti-estradiol antibody was coupled to the beads.

Samples

In the context of the invention, different samples were employed. The samples specifically included solutions spiked with defined amounts of the respective analyte. It is specified in the respective example in which matrix the respective analyte was spiked. The matrixes used throughout the Examples included a 60 vol % MeOH solution, UniDil and Golden West Serum (Golden West Diagnostic LLC; Cat. Numb. MSG4000).

Internal Standards Used for Quantitative Mass Spectrometry

As internal standards, heavy-isotype labeled isotopes of the respective analytes were used. For detection of testosterone, 13C3-Testosterone (from Cerilliant) was used. For the quantification of estradiol, 13C3-Estradiol (from Cerilliant) was employed. If not stated otherwise, 10 µl of a 10 ng/ml internal standard solution were spiked into a sample volume of 150 µl before pretreatment and immunobead based solid phase extraction.

Pretreatment of Samples

The analytes used in the examples below are steroids. Steroids may be bound by binding proteins in the context of samples such as serum or plasma. Therefore, a pretreatment was conducted to release the steroids from binding proteins prior to enrichment of the analytes by immunobead based solid phase extraction. For the pretreatment, 50 µl of an aqueous 30 vol % MeOH solution was added to 150 µl sample and the sample was mixed by vortexing.

Immunobead Based Solid Phase Extraction of Analytes

To extract and/or enrich the analyte in the sample immunobead based solid phase extraction was performed. To this end, the analyte specific magnetic immunobeads (see above) were added to the pre-treated sample spiked with an internal standard. Specifically, 40 µl of a 1 mg/mL, solution were added. The mixture was vortexed and incubated for 7.5 min at 37° C. to allow analyte binding to the beads. Subsequently, the beads were washed with 200 µl water two or three times. Finally, the analyte was eluted from the beads using an aqueous 80% methanol elution. For experiments involving a subsequent evaporation step (full or partial) an elution solution volume of 150 µl was used. A volume of 60 µl elution solution was used for workflows without evaporation. For elution, magnetic beads were separated by magnetic force after the last washing step, the supernatant was removed, the elution solution was added to the beads, and the mixture of beads and elution solution was vortexed and incubated for 2 min at 37° C. Finally, the beads were separated by magnetic force and 130 µl (workflow including evaporation) or 40 µl (workflow without evaporation) of the eluate supernatant (also referred as solid phase extraction extract) comprising the analyte were removed and pipetted into a fresh vessel.

The recovered eluate was subsequently either subjected to evaporation (full or partial, see below) or in the workflows that did not involve evaporation the 40 µl of the recovered eluate were diluted to a final volume of 107 µl using LC-DIL.

Evaporation

Evaporation of an eluate of the immunobead based SPE or spiked solutions was conducted by applying vacuum and heating at 50 to 100° C. using a custom-made device. The start volume was, if not stated otherwise, 130 µl.

For full evaporation, the sample was evaporated to dryness. The remaining pellet was subsequently resolved in 40 µl LC-DIL using vortexing.

For partial evaporation, the evaporation was conducted until a final solvent volume of 20 to 40 µl remained. The final volume before subjecting the sample to LC-MS was adjusted to 40 µl (if required) using LC-DIL.

High-Performance Liquid Chromatography (HPLC) Coupled to MS

High-performance liquid chromatography (HPLC) was performed using an Agilent 1200 Infinity II LC System (Waldbronn, Germany) and the PAL LC injection and autosampler system (Zwingen, Switzerland). The instrument was controlled via the Analyst device driver from AB Sciex. Chromatographic separation was performed using a C18 HPLC column (1.0 or 2.1 mm i.d.×50 mm) packed with SunShell 2.6 µm fused core particles from ChromaNik (Osaka. Japan). The LC solvents used were (A) water and (11) 0.2 mM NH4F in methanol, and the flow rate used was 440 µl/min. The LC gradient was established by ramping from between 39% and 60% solution B to between 90% and 98% solution B within 0.7 to 1.2 min. The volume injected onto the LC-MS system was 20 µl independent of the sample preparation workflow (with or without evaporation).

Mass Spectrometry (MS)

Mass spectrometric detection was carried out using a Triple Quad 6500+ LC-NIS/MS system from AB Sciex (Darmstadt, Germany) or comparable MS devices.

The MS settings for the measurement of testosterone was selected to be in the positive-mode and the NIS settings were optimized for sensitivity. The MS settings for the measurement of estradiol were selected to be in the negative-mode and were also optimized for sensitivity.

Data Analysis

The MS systems used optimized settings for the analytes and associated software for machine control and data analysis. Chromatographic peaks of analyte selective MRM transitions were integrated by Gaussian fits to generate peak areas and signal-g to-noise (S/N) for analyte and internal standards, which are directly compared from different workflows (i.e. dilution, partial evaporation, and full evaporation workflows) to compare sensitivity enhancement or recovery. Analyte/ISTD ratios were used to further evaluate the LC-MS method precision and sensitivity and compare the different workflows.

Example 1: Concentrating Testosterone in a Neat Sample Using Full and Partial Evaporation In this Example, three different workflows of handling spiked samples before subjecting them to LC-MS are compared. (1) dilution of the sample; (2) full evaporation; and (3) partial evaporation.

Specifically, samples containing 60 pg/ml testosterone in 60 vol % MeOH were produced. These samples mimic eluates/extracts as obtained by elution from bead based SPE, especially from the immunobead based SPE as also used herein below and described in the methods above.

For the samples subjected to the dilution workflow, the samples were diluted with 40 µl, of H2O to a total final volume of 80 µl. For the samples subjected to full evaporation, the samples were evaporated to complete dryness and then reconstituted with 40 µL of 30° % MeOH. For the samples used for partial evaporation, the samples are evaporated to 10 µL (partial evaporation) and then diluted with 30 µL of 30% MeOH to a total final volume of 40 µL. It was ensured all samples contained a final organic content of 30% MeOH.

The samples finally subjected to LC-MS and the signal intensity for testosterone was measured (see FIG. 1A) lased on setting the intensity for the dilution workflow to 100% the testosterone recovery for the two evaporation workflows was calculated in percentage (see FIG. 1B).

Because all samples contained the same amount of analyte, the fully and partially evaporated samples were both expected to have 200% analyte recovery. While an increase in the recovery was achieved with both full and partial evaporation, the recovery of analyte was surprisingly significantly better when using partial evaporation. Another advantage of partial evaporation is the shorter duration of the evaporation process. Shortening the time required for evaporation becomes important, in particular, in the context of automated sample preparation and LC-MS analyzing systems.

In view of these results, partial evaporation was selected for the experiments shown in the further Examples Whenever these examples and the Figures referring thereto mention "evaporation", this relates to "partial evaporation" as described in the methods above.

Example 2: Partial Evaporation Versus Dilution or Immunobead Eluates in MS Sample Preparation Workflows for Detecting Estradiol Diagnostic MS measurements typically do not involve neat samples but rather complex samples comprising the analyte in the context of a complex matrix with other constituents, such as blood-based samples (e.g. serum or plasma). To measure these samples a sample preparation workflow purifying the analyte as much as possible from the remaining constituents is typically used. To this end, methods such as SPE can be employed. In the present example immunobead-based SPE is used involving elution of the analyte from beads with elution solutions comprising high organic solvent (e.g. MeOH or acetonitrile) content. These solvents at high concentrations can interfere with the LC resolution of a LC-MS system and method. e.g. by peak broadening. Therefore, SPE eluates are typically diluted before LC-MS to reduce the concentrations of the organic solvents before LC. However, such dilution reduces the analyte concentration and makes it more challenging to detected low concentrations in the initial sample, especially in samples comprising complex matrix that show % typically higher background signal than neat samples.

To compare the performance of partial evaporation versus sample dilution in the context of an entire MS workflow an experiment performing an entire MS workflow comprising (1) addition of an internal standard, (2) immunobead-based SPE of the analyte. (3) partial evaporation or dilution of the SPE eluate and (4) LC-MS was conducted as described in the Materials and Methods section above.

Figure 2:
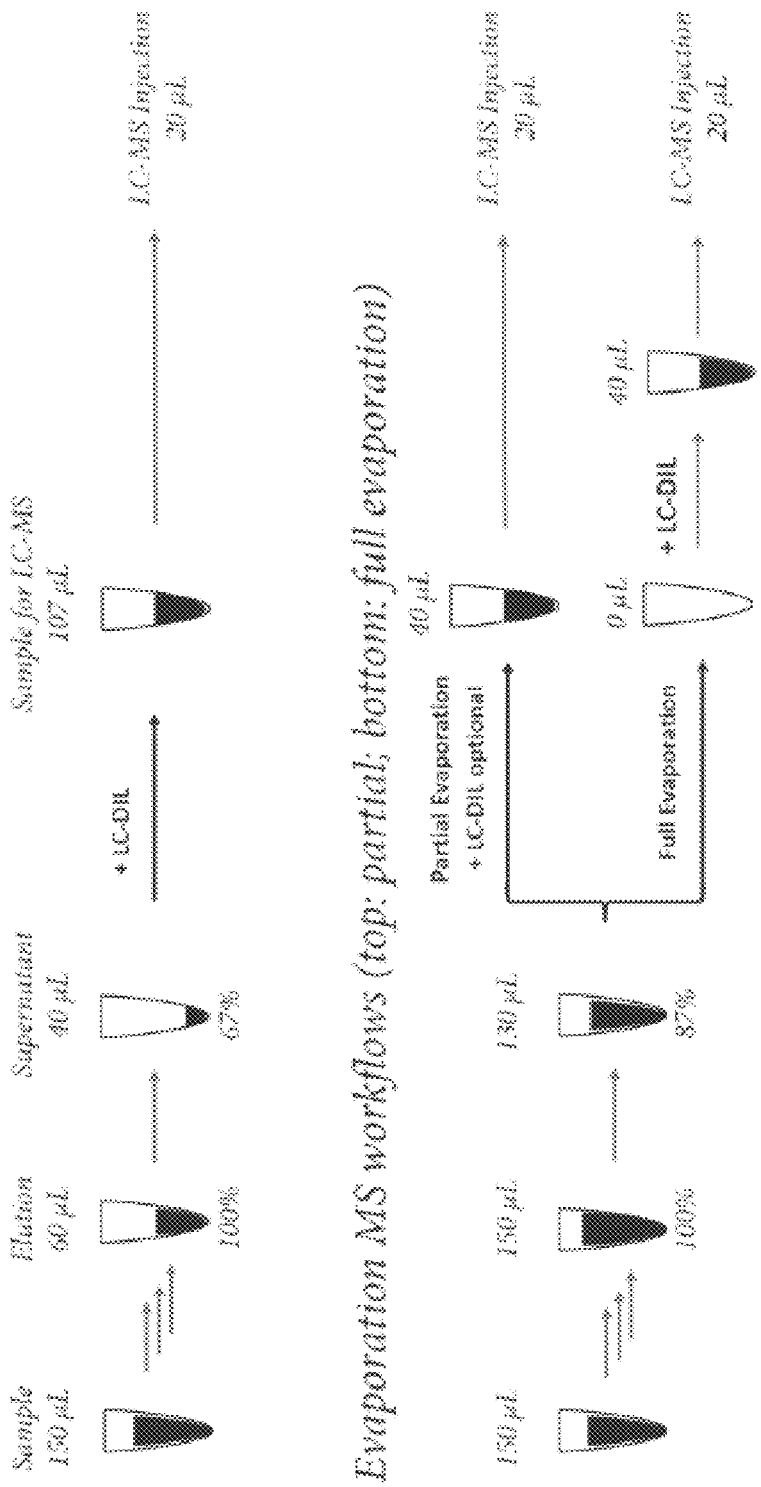
FIG. 2: Schematic illustrations of standard dilution workflow (top) and full and partial evaporation workflows (bottom) optimized to maximize detection sensitivity and chromatographic performance. Also depicted is a full evaporation workflow as used in FIG. 1 (middle). All work-lows proceed by mixing 150 µL of sample and internal standard, addition of pre-treatment to release analytes front binding proteins, analyte enrichment by antibody-coated magnetic beads, and minimization of the unbound matrix components by washing twice with water. Analyte was released using 60 µL or 150 µL of 80. MeOH elution buffer followed by transfer of 40 µL or 130 µL eluate to a fresh reaction vessel for standard and evaporation workflows, respectively. In the normal workflow, 40 µL eluate is diluted with 67 µL water, and for the evaporation workflows, the sample is either evaporated to complete dryness (full evaporation) or to 20 to 40 µL (partial evaporation), and the sample is optionally diluted with water to provide a final volume of 40 µL. For all workflows, 20 µL is injected for LC-MS analysis.

The samples subjected to the dilution MS workflow and the evaporation MS workflow were 150 µl of UniDil (Elecsys® Diluent Universal) spiked with 0.5 pg/ml, 2 pg/ml, 5 pg/ml, 10 pg/ml and 15 pg/ml estradiol, respectively. The dilution workflow and the partial evaporation used are schematically depicted in FIG. 2.

Figure 3:
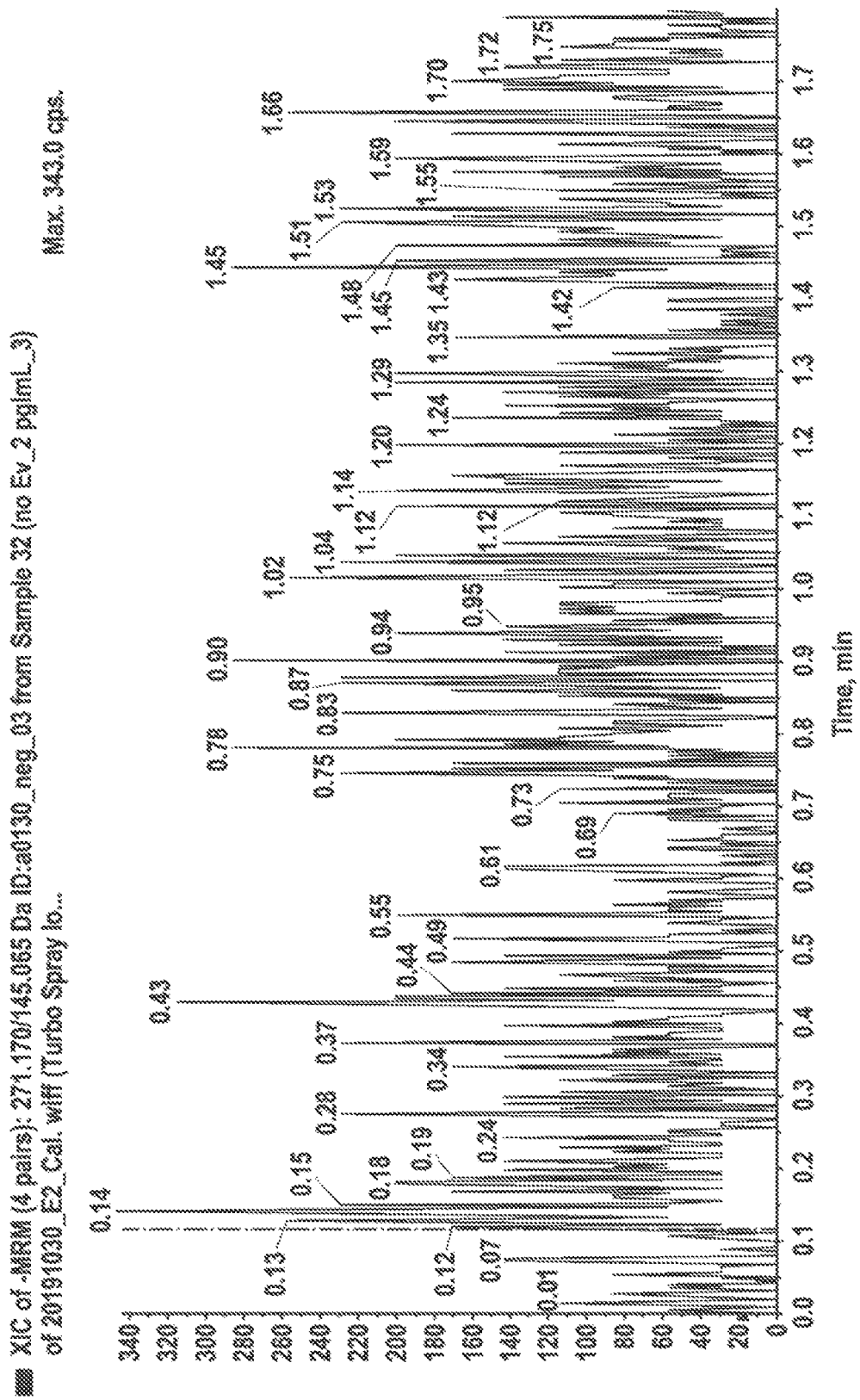
FIGS. 3 and 4: Extracted ion chromatograms of 2 µg/mL estradiol spiked in UniDil comparing standard workflow (FIG. 3) and optimized partial evaporation workflow (FIG. 4). The analyte chromatographic peak could be clearly detected using the evaporation assay, but not with the standard assay.
Figure 4:
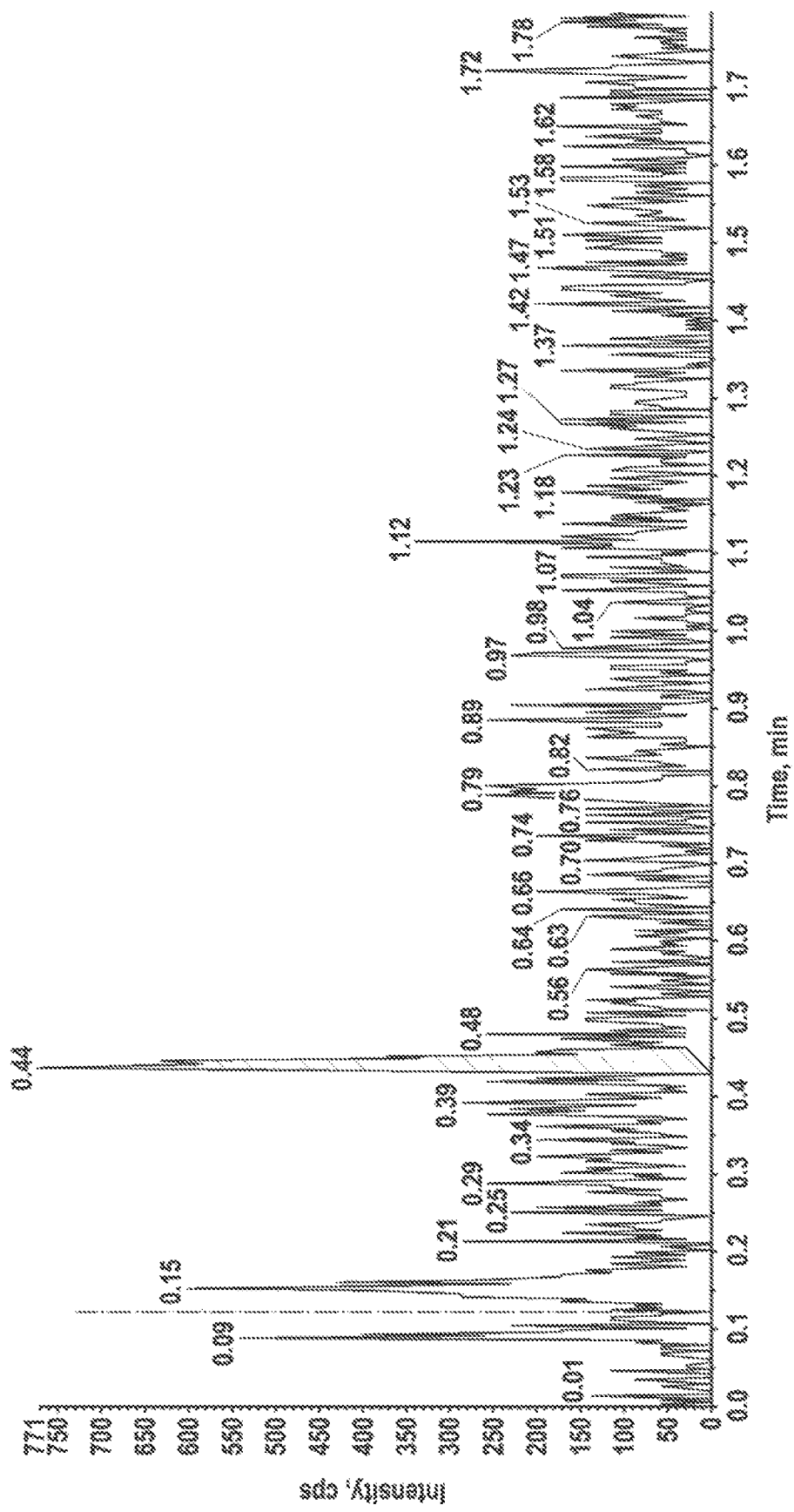

The resulting MS spectra from the dilution workflow and the partial evaporation workflow for the 2 pg/ml samples are shown in FIGS. 3 and 4, respectively.

As evident from FIGS. 3, using the dilution workflow the estradiol signal was not detectable in this particular experiment.

By contrast, the signal for estradiol was clearly detectable using the partial evaporation workflow (see FIG. 4), indicating the increased sensitivity achieved with the partial evaporation workflow.

Accordingly, this experiment demonstrates that partial evaporation can increase signal-to-noise ratio and analyte detection sensitivity (lower limit of quantification), even when measuring an analyte in a more complex matrix and in context of a multi-step sample preparation workflow to provide a highly purified analyte sample followed by high-resolution LC separation.

Figure 5:
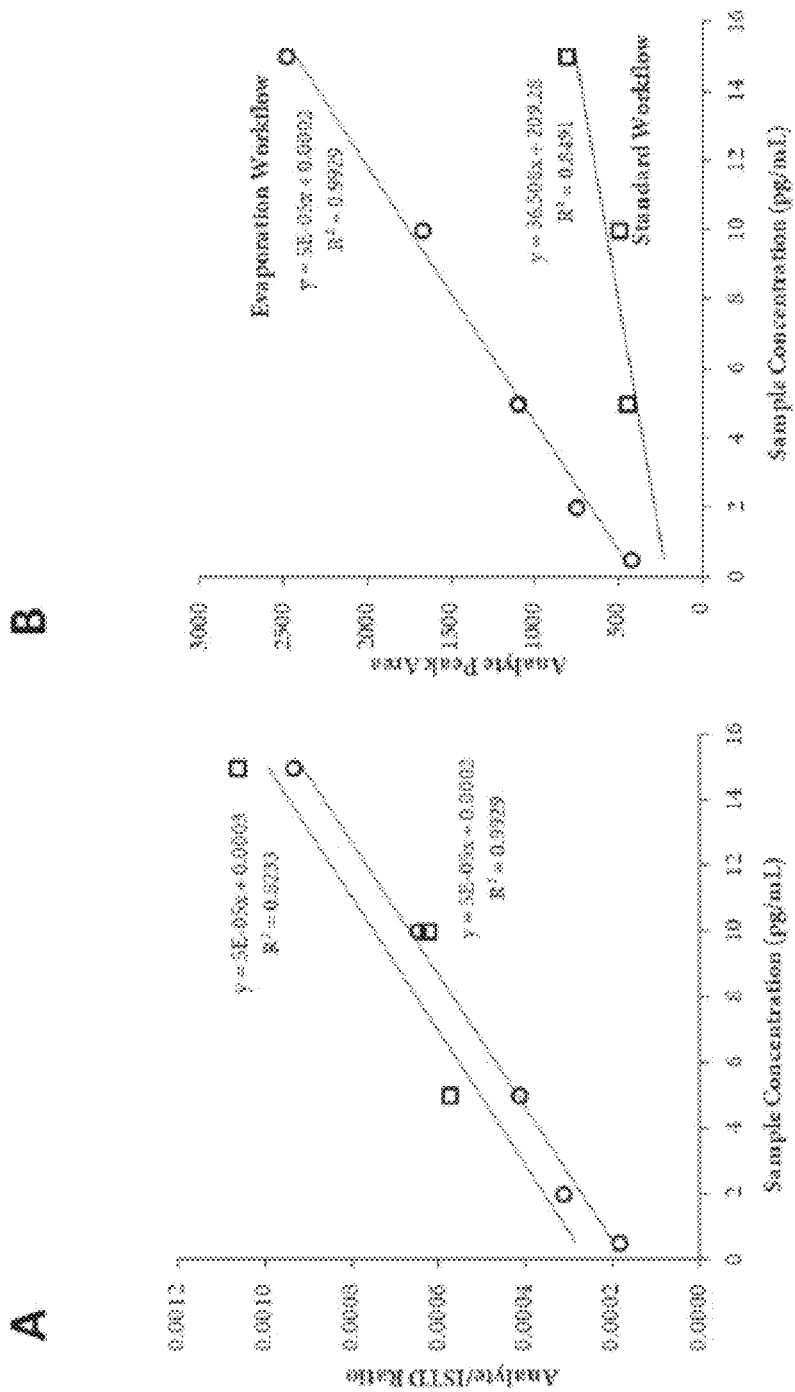
FIGS. 5 and 6: Analyte/ISTD peak area ratios were the same for standard workflow and optimized evaporation workflow (A), and the linear fit of analyte peak area and analyte concentration demonstrated the evaporation workflow % has a higher slope (B) for Estradiol spiked into UniDil (FIG. 5) and Testosterone spiked into Golden West Serum (FIG. 6).

FIG. 5B depicts the signal intensity for both the partial evaporation workflow and the dilution workflow plotted against the analyte concentrations. This figure illustrates that for each of the analyzed samples signal (peak area) for the partial evaporation workflow was increased over the dilution workflow. Further, for both workflows a linear measurement range was achieved in the analyzed concentration range above the LoQ. Yet, the partial evaporation workflow shows a higher slope in the linearity. The increased slope is a clear advantage since the signal dynamic for a given concentration difference is increased, and thus accuracy may be increased.

FIG. 5A shows the ratios of the analyte signals and the internal standard (ISTD) at the measured analyte concentrations. For both the dilution and the partial evaporation workflows, the ratios are similar and increases linearly with the same slope over the measured concentration range.

Example 3: Partial Evaporation Versus Dilution of Immunobead Eluates in MS Sample Preparation Workflows for Detecting Testosterone A comparison between the partial evaporation workflow versus the dilution workflow was repeated using samples of Golden West Serum spiked with the analyte testosterone at concentrations of 25 pg/ml 150 pg/ml and 250 pg/ml.

As in Example 2 above, an entire MS workflow comprising (1) addition of an internal standard. (2) immunobead-based SPF, of the analyte, (3) partial evaporation or dilution of the SPE eluate and (4) LC-MS was conducted as specified in the Materials and Methods section, above.

The samples subjected to the dilution MS workflow and the evaporation MS workflow were 150 µl of Golden West Serum spiked with 25 pg/ml 150 pg/ml and 250 pg/ml, testosterone, respectively. The dilution workflow and the partial evaporation used are schematically depicted in FIG. 2.

Figure 6:
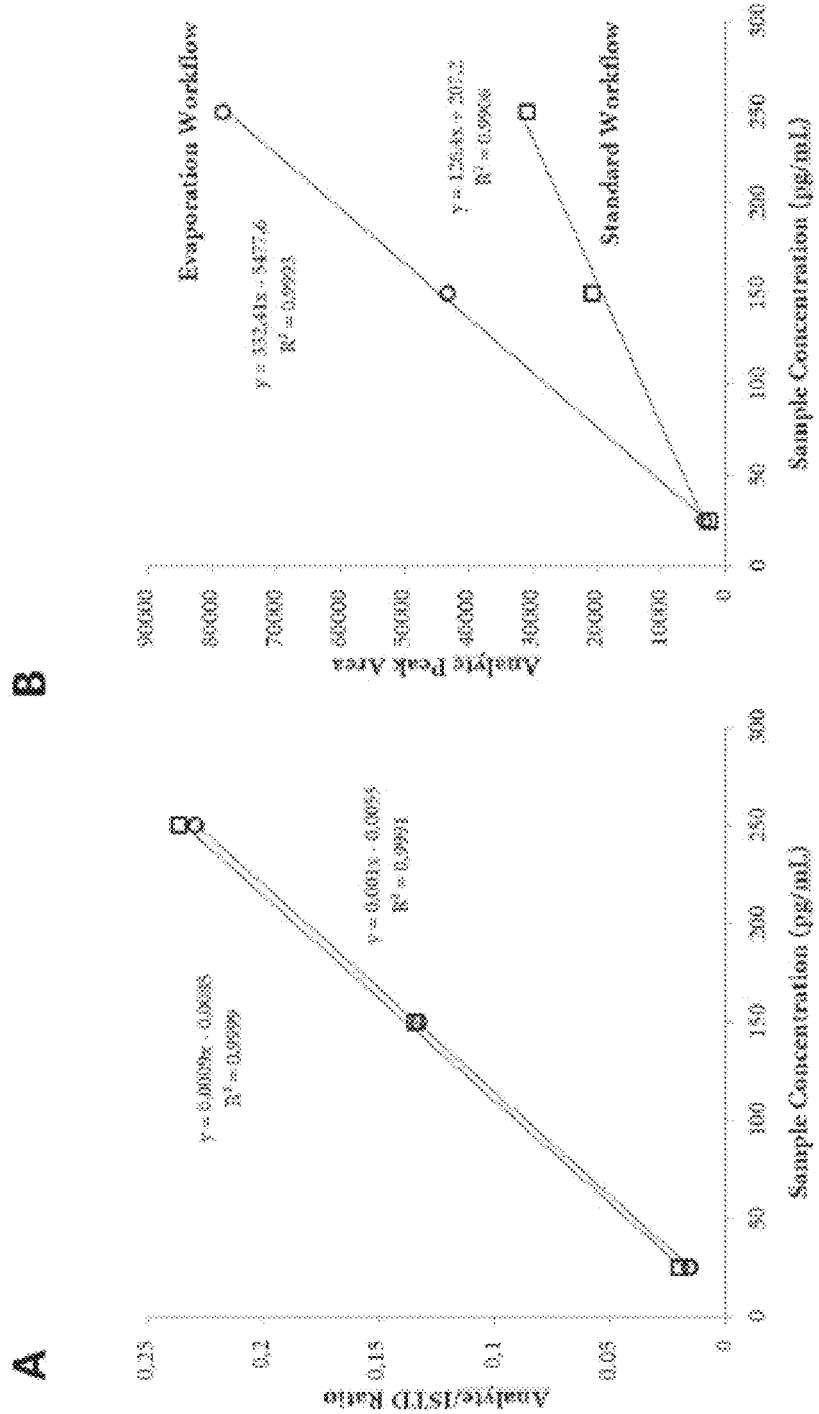

FIG. 6B depicts the signal intensity for both the partial evaporation workflow and the dilution workflow plotted against the analyte concentrations. This figure illustrates that for each of the analyzed samples signal (peak area) for the partial evaporation workflow was increased over the dilution workflow. Further, for both workflows a linear measurement range was achieved in the analyzed concentration range above the limit of quantification (LOQ). Yet, the partial evaporation workflow shows a higher slope in the linearity. The increased slope is a clear advantage since the signal dynamic for a given concentration difference is increased, and thus accuracy may be increased.

FIG. 6A show s the ratios of the analyte signals and the internal standard (ISTD) s at the measured analyte concentrations. For both the dilution and the partial evaporation workflow, the ratios are similar and increases linearly with the same slope over the measured concentration range.

This patent application claims the priority of the European patent application 20215190.8, wherein the content of this European patent application is hereby incorporated by references.

The invention claimed is:

1. A method for detecting and/or quantifying an analyte in a sample using mass spectrometry, said method comprising:
    a) extracting the analyte from the sample using solid phase extraction (SPE) so as to obtain an SPE extract comprising the analyte, wherein the SPE extract comprises 50 vol % to 100 vol % of an organic solvent, wherein the analyte is a steroid;
    b) concentrating the analyte, said concentrating comprising partially evaporating the solvent from the SPE-extract obtained in a); wherein the volume of the SPE-extract subjected to the partial evaporation is reduced by 50% to 95%;
    b1) diluting the concentrated analyte obtained from step b) with a dilution solvent to obtain a diluted analyte, wherein the diluted analyte comprises less than 50 vol % of the organic solvent or a further organic solvent prior to step c); and c) detecting and/or quantifying the analyte in the sample using mass spectrometry, wherein the mass spectrometry is mass spectrometry coupled to liquid chromatography (LC-MS).

2. The method of claim 1, wherein the method further comprises adjusting the volume after partial evaporation using a diluent solution to a final volume corresponding to 5% to 40% of the volume of the sample subjected to the SPE in a).

3. The method of claim 1, wherein the sample volume subjected to the SPE in a) is 250 µl or less.

4. The method of claim 1, wherein the organic solvent is selected from the group consisting of acetonitrile and methanol.

5. The method of claim 1, wherein the sample is a fluid.

6. The method of claim 1, wherein said method further comprises a pretreatment step for releasing the analyte from an analyte binding protein.

7. The method of claim 1, wherein the solid phase used for the SPE is formed by magnetic particles.

8. The method of claim 1, wherein the solid phase of the SPE is formed by particles that are coated with an antibody specifically binding to the analyte.

9. The method of claim 1, wherein the solid phase extraction (SPE) comprises:
a) capture the analyte to a solid phase;
b) optionally one or more wash steps of the solid phase; and
c) eluting the analyte from the solid phase to obtain the SPE extract comprising the analyte.

10. The method of claim 9, wherein the volume of the added elution solvent corresponds to 50% to 150% of the sample volume subjected to SPE.

11. The method of claim 1, wherein said method further comprises adding an internal standard (ISTD) for quantification to the sample prior to step a).

12. The method of claim 1, wherein the liquid chromatography (LC) is HPLC or rapid LC.

13. The method of claim 1, wherein the analyte is testosterone or estradiol.

14. The method of claim 1, wherein the volume of the SPE-extract subjected to the partial evaporation is reduced by 60% to 90% or by 70% to 80%.

15. The method of claim 2, wherein the method comprises adjusting the volume after partial evaporation using a diluent solution to a final volume corresponding to 10% to 30% or 13% to 27% of the volume of the sample subjected to the SPE in a).

16. The method of claim 3, wherein the sample volume subjected to the SPE in a) is 200 µl or less or 150 µl or less.

17. The method of claim 5, wherein the sample is a biological fluid, wherein the biological fluid is serum or plasma.

18. The method of claim 7, wherein the magnetic particles are magnetic microbeads.

19. The method of claim 10, wherein the volume of the added elution solvent corresponds to 90% to 120% of the sample volume subjected to SPE.

20. The method of claim 12, wherein the HPLC is a Micro LC (µLC) and/or an Ultra high performance liquid chromatography (UHPLC).

* * * * *